(12) United States Patent
Bobbitt, III

(10) Patent No.: US 9,428,124 B2
(45) Date of Patent: Aug. 30, 2016

(54) HAPTIC SEAT FOR FUEL ECONOMY FEEDBACK

(75) Inventor: John Thomas Bobbitt, III, Aiken, SC (US)

(73) Assignee: SAVANNAH NUCLEAR SOLUTIONS, LLC, Aiken, SC (US)

( * ) Notice: Subject to any disclaimer, the term of this patent is extended or adjusted under 35 U.S.C. 154(b) by 3 days.

(21) Appl. No.: 13/461,916

(22) Filed: May 2, 2012

(65) Prior Publication Data

US 2012/0283939 A1  Nov. 8, 2012

Related U.S. Application Data

(60) Provisional application No. 61/481,843, filed on May 3, 2011.

(51) Int. Cl.
| | |
|---|---|
| *B60R 16/00* | (2006.01) |
| *B60R 16/023* | (2006.01) |
| *G06F 19/00* | (2011.01) |
| *B60W 50/16* | (2012.01) |
| *B60N 2/44* | (2006.01) |

(52) U.S. Cl.
CPC .......... *B60R 16/0236* (2013.01); *B60W 50/16* (2013.01); *G06F 19/00* (2013.01); *B60N 2002/4485* (2013.01); *B60W 2510/0604* (2013.01); *B60W 2510/0623* (2013.01); *B60W 2520/10* (2013.01); *B60W 2520/105* (2013.01); *B60W 2520/125* (2013.01); *B60W 2550/12* (2013.01); *B60W 2550/142* (2013.01); *B60W 2550/143* (2013.01); *B60W 2550/402* (2013.01)

(58) Field of Classification Search
CPC .. B60W 50/16; B60W 40/09; B60W 40/105; B60W 2520/105; B60K 2026/022; B60N 2002/4485; B60Q 9/00
USPC ............... 701/1, 2, 123, 36, 41, 42, 96, 57; 340/435, 439, 440, 905; 123/399; 297/217.3
See application file for complete search history.

(56) References Cited

U.S. PATENT DOCUMENTS

| | | | |
|---|---|---|---|
| 6,422,941 B1 | 7/2002 | Thorner et al. | |
| 7,636,034 B2 * | 12/2009 | Hijikata et al. | 340/438 |
| 7,681,949 B2 | 3/2010 | Nathan et al. | |
| 7,864,034 B2 | 1/2011 | Hijikata et al. | |
| 2005/0192727 A1 * | 9/2005 | Shostak et al. | 701/37 |
| 2005/0275520 A1 * | 12/2005 | Hijikata et al. | 340/466 |
| 2006/0025897 A1 * | 2/2006 | Shostak | B60C 23/005 701/1 |
| 2007/0027593 A1 | 2/2007 | Shah et al. | |
| 2008/0042489 A1 * | 2/2008 | Lewis et al. | 303/152 |
| 2008/0120175 A1 * | 5/2008 | Doering | B60R 16/0236 705/14.67 |
| 2008/0283024 A1 * | 11/2008 | Gregorio | 123/399 |
| 2009/0015045 A1 * | 1/2009 | Nathan et al. | 297/217.3 |
| 2009/0043467 A1 * | 2/2009 | Filev et al. | 701/57 |

(Continued)

*Primary Examiner* — Jelani Smith
(74) *Attorney, Agent, or Firm* — J. Bennett Mullinax, LLC

(57) ABSTRACT

A process of providing driver fuel economy feedback is disclosed in which vehicle sensors provide for haptic feedback on fuel usage. Such sensors may include one or more of a speed sensors, global position satellite units, vehicle pitch/roll angle sensors, suspension displacement sensors, longitudinal accelerometer sensors, throttle position in sensors, steering angle sensors, break pressure sensors, and lateral accelerometer sensors. Sensors used singly or collectively can provide enhanced feedback as to various environmental conditions and operating conditions such that a more accurate assessment of fuel economy information can be provided to the driver.

9 Claims, 2 Drawing Sheets

(56) References Cited

U.S. PATENT DOCUMENTS

| | | | |
|---|---|---|---|
| 2009/0281715 A1* | 11/2009 | Paik | 701/123 |
| 2010/0030458 A1* | 2/2010 | Coughlin | 701/123 |
| 2010/0090818 A1* | 4/2010 | Sekiyama et al. | 340/439 |
| 2011/0193693 A1* | 8/2011 | Filev et al. | 340/435 |
| 2012/0197501 A1* | 8/2012 | Sujan et al. | 701/51 |

* cited by examiner

HAPTIC SEAT FOR FUEL ECONOMY FEEDBACK

RELATED APPLICATIONS

This application claims the benefit of U.S. Provisional Application 61/481,843, filed on May 3, 2011 and which is incorporated herein by reference.

STATEMENT AS TO RIGHTS TO INVENTIONS MADE UNDER FEDERALLY SPONSORED RESEARCH AND DEVELOPMENT

This invention was made with Government support under Contract No. DE-AC09-08SR22470 awarded by the United States Department of Energy. The Government has certain rights in the invention.

FIELD OF THE INVENTION

This invention is directed towards a haptic seat, a process and system for use in automobiles and trucks which uses tactile sensation such as a vibration, impulse, a shake, or other tactile perception to provide an operator of the vehicle feedback as to fuel economy and driving efficiency. Further, the seat can provide information to the driver on how to operate the vehicle in a more fuel-efficient manner.

BACKGROUND OF THE INVENTION

Current fuel economy feedback is primarily achieved through instrument panel displays. Instrument panel displays require that the driver divert attention away from the primary responsibilities of operating the vehicle. The use of audible feedback for driving economy information is complicated by ambient noise of the road as well as stereo and conversation noises that would obscure feedback. Additional audible feedback is easily overlooked and is likely to be perceived as an annoyance by both driver and vehicle passengers.

It is also known to use vibration applied to a steering wheel as one form of feedback. Moreover, studies have demonstrated that such vibration signals through the steering wheel are objectionable. Similarly, providing a tactile feedback through the pedal system of gas or brakes is also dis-favored by drivers in that the vibrations may interfere with detection of road conditions and can be further impaired by the type of footwear utilized by a driver.

In addition, current fuel economy feedback tends to rely upon instantaneous fuel economy numbers. This is based on fuel used over a distance just traveled. It is left to the operator of the vehicle to decide if the instantaneous fuel economy was good or bad, as well as what steps to take to improve the economy. The instantaneous value fails to take into account environmental considerations such as grade, further complicating the operator's job in evaluating the merits of their fuel economy. For instance, driving up a steep grade or incline will require more fuel than travel on a more level terrain. Indicating to a driver negative fuel economy feedback under such conditions is counter productive. Accordingly, there remains room for variation and improvement within the art.

SUMMARY OF THE INVENTION

It is one aspect of one of the present embodiments of the invention to provide for haptic feedback information to an operator of a motor vehicle regarding fuel economy performance.

It is a further aspect of at least one of the present embodiments of the invention to provide for a process of driver fuel economy feedback in which vehicle sensors provide for haptic feedback on fuel usage. Such sensors may include one or more of a speed sensors, global position satellite units, vehicle pitch/roll angle sensors, suspension displacement sensors, longitudinal accelerometer sensors, throttle position in sensors, steering angle sensors, break pressure sensors, and lateral accelerometer sensors. Sensors used singly or collectively can provide enhanced feedback as to various environmental conditions and operating conditions such that a more accurate assessment of fuel economy information can be provided to the driver. Feedback via the haptic seat allows the driver to be provided with qualitative feedback on how efficient or inefficient the driver is in operation of the vehicle.

It is a further aspect of at least one of the present embodiments to provide for an improved measurement of instantaneous fuel economy that incorporates environmental factors including grade, pay load, and driving styles.

It is a further aspect of at least one of the present embodiments to provide for haptic feedback for drivers with respect for fuel economy which greatly reduces false negative feedback. This feedback can be both negative feedback to indicate less than desirable driving patterns, and positive feedback to reinforce optimal driving patterns.

It is a further aspect of at least one of the present embodiments to provide for an improved calculation of instantaneous fuel economy which can be archived and used for improvement of fuel economy on fleet passenger cars and commercial vehicles.

It is a further aspect that at least one of the present embodiments to provide for a process of monitoring fuel economy comprising: providing a vehicle having a plurality of environmental sensors; providing information from the plurality of environmental sensors to a controller; providing additional information of vehicle operation data to the controller; determining a relative scale of fuel efficiency of the operator relative to the environmental conditions that the vehicle is experiencing; and, providing sensory feedback to the operator which is indicative of fuel efficiency.

It is a further aspect of at least one of the present embodiments to provide for a process of monitoring fuel economy comprising: determining an operating temperature, a vehicle angle of incline, a payload, and an altitude in which an automotive vehicle is operating; calculating a maximum theoretical fuel efficiency for the operating conditions of the vehicle; evaluating an actual fuel efficiency of the vehicle compared to the maximum theatrical value; relaying a qualitative evaluation of fuel efficiency obtained by the operator to the operator using a sensory information delivery system.

It is a further aspect of at least one of the present embodiments to provide for a process of monitoring fuel economy wherein the plurality of environmental sensors are selected from the group of environmental sensors selected from the group consisting of pitch sensors, roll angle sensors, temperature sensors, grade sensors, payload sensors, vehicle height sensors, GPS sensors and combinations thereof. The vehicle operation data includes data selected from the group consisting of throttle position sensors, pitch angle sensors, fuel flow sensors, braking sensors, speed sensors, longitudinal G's sensor, lateral G's sensor and combinations thereof.

These and other features, aspects, and advantages of the present invention will become better understood with reference to the following description and appended claims.

BRIEF DESCRIPTION OF THE DRAWINGS

A fully enabling disclosure of the present invention, including the best mode thereof to one of ordinary skill in the art, is set forth more particularly in the remainder of the specification, including reference to the accompanying drawings.

DESCRIPTION OF THE PREFERRED EMBODIMENT

Figure 1:
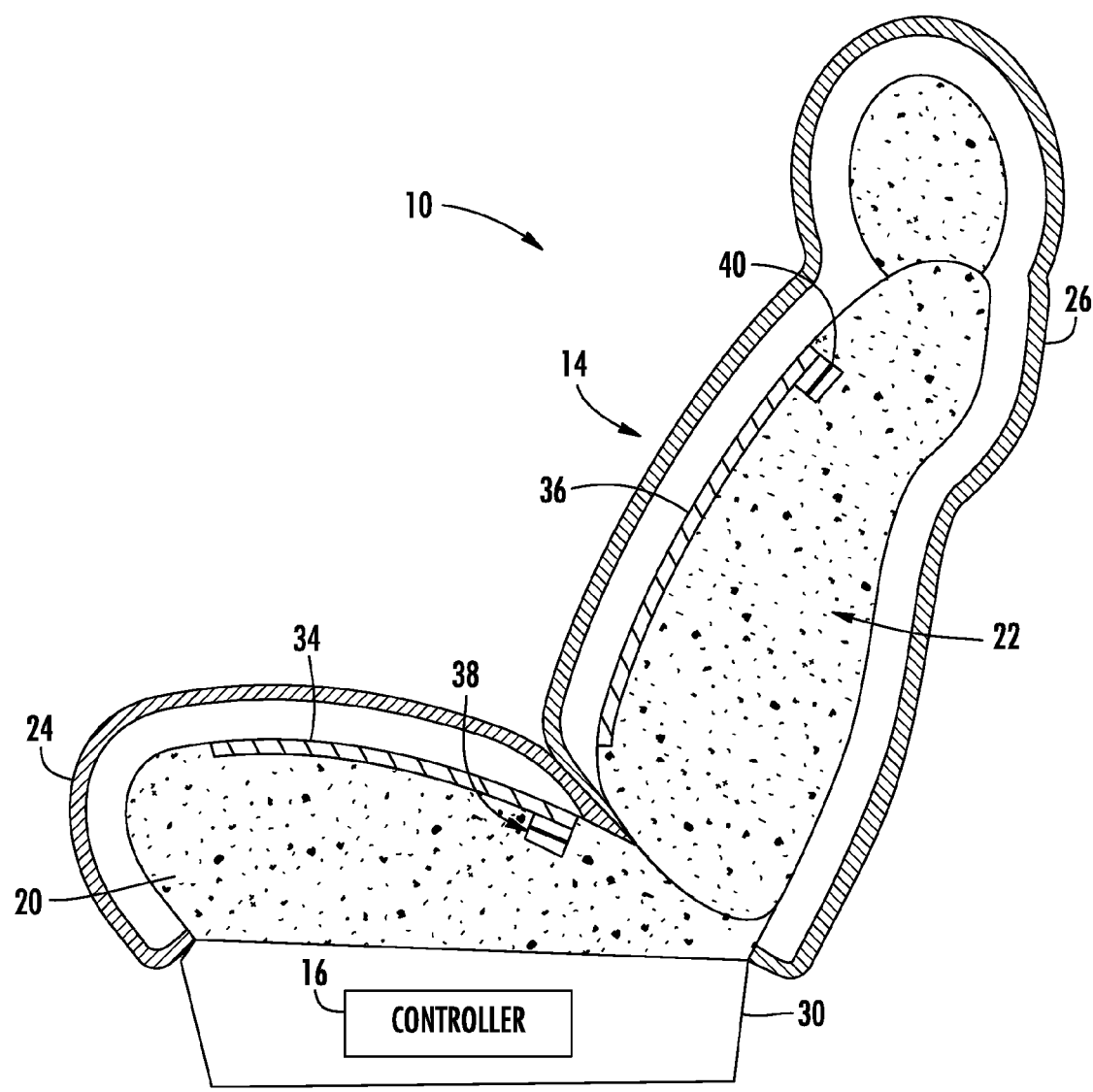
FIG. 1 illustrates a haptic seating system in accordance with one aspect of the present invention.

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

A driver is in constant contact with only two parts of the vehicle, the steering wheel and the seat. It is believed that using one of these two driver interfaces will allow a feedback system to be developed and deployed in which fuel efficiency and economy information can be provided to the driver without requiring the driver to divert his attention away from driving. By providing driver feedback through at least one of either a steering wheel or a seat allows feedback to be provided to the driver at appropriate times and not only at intervals when a driver may chose pay attention to the information. While the description of the invention below is stricted towards a preferred embodiment of a haptic seat, similar methodology and goals could be accomplished through use of a haptic steering wheel.

In at least one of the preferred embodiments of the invention, the driver provided feedback makes use of sensors within the vehicle to take into account environmental conditions and operating conditions so as to provide a better indication of fuel economy. By recognizing conditions that will inherently result in lower fuel economy, such as climbing a steep grade, the feedback system can minimize negative feedback so as to avoid a disincentive or reluctance to use the feedback system.

The development of a haptic feedback system coupled with a greater intuitive and logical calculation of fuel efficiency offers numerous advantages. One, such technologies can promote a more fuel efficient driving behavior. By developing a system to provide feedback through the seat, for instance, one avoids feedback mechanisms which use overloaded visual or audible means.

A more inclusive measurement of environmental factors and driving styles will provide a more realistic landscape of fuel economy and further help prevent false negative feedback which could negate use and acceptance of the technology by drivers. For example, a heavily laden vehicle uses more fuel than one which is lightly laden. By inferring the payload weight, a more accurate calculation of the theoretical fuel efficiency target can be made. Without accounting for the additional payload, the driver would receive negative feedback, even when operating the vehicle at its theoretical best fuel efficiency for the given conditions. Similarly, a vehicle travelling up or down steep grades has different fuel efficiency targets. Without taking the grade into account, a driver who is operating the vehicle efficiently uphill would still receive negative feedback and a driver operating a vehicle in an inefficient manner downhill could receive incorrect positive feedback on their performance.

By avoiding such incorrect feedback, the overall process is enhanced by providing the operator with real time information based on actual operating and environmental conditions.

It is further envisioned that the technology can be implemented on a simulator that will allow reproducible environments and allow drivers to utilize multiple training reiterations in order to gain confidence that the system provides useful information that when acted upon by the driver will bring about an increase in fuel economy.

It is believed that providing feedback to the seat is a novel approach for promoting fuel efficient driving behavior. Current feedback and methodologies of dash indicators or audible feedbacks require diversion of a driver's attention.

To accomplish these goals and objectives, there are a number of sensors and data points that can be measured and integrated into various algorithms' or calculations regarding fuel efficiency of a vehicle. The additional sensing capabilities are believed important to have a viable instantaneous feedback system since current mile per gallon feedback does not take into account various road and environmental conditions. By including a more complete data set of applicable perimeters, it is possible to avoid false and negative information which would discourage use of the system by drivers. As set forth in Table 1 below, there is a list of environmental factors to consider in the improved fuel economy metric and sensors. Additionally, table 2 has a list of operator factors to consider.

TABLE 1

| Environmental Factors | | |
| --- | --- | --- |
| Environmental Factors | Purpose | Sensors |
| Grade | Uphill grades require more power (and therefore fuel) Downhill grades can utilize regenerative braking to maintain speed | Pitch/Roll angle GPS |
| Temperature | Temperature affects engine and battery performance | Temperature |

TABLE 1-continued

Environmental Factors

| Environmental Factors | Purpose | Sensors |
|---|---|---|
| Payload | Higher payload requires more power (and therefore more fuel) to accelerate and climb grades | Ride height<br>Pitch angle<br>Throttle position<br>Longitudinal g's |

TABLE 2

Operator Factors

| Operator Factors | Purpose | Sensors |
|---|---|---|
| Steadiness of throttle | Excessive throttle modulation uses more fuel | Throttle position<br>Pitch angle<br>Speed<br>GPS |
| Use of regenerative braking | Stopping too quickly does not optimize utilization of regenerative braking | Brake pressure<br>Longitudinal g's<br>Throttle position<br>GPS |
| Aggressive driving | Hard acceleration and deceleration use more fuel | Throttle position<br>Longitudinal g's<br>Lateral g's<br>Brake pressure<br>GPS |

A variety of sensors can be used that allow monitoring of fuel usage such as fuel flow, fuel pressure, and similar parameters. In addition other sensors such as the throttle, usage of brakes, and accelerators to gauge aggressive driving in terms of rapid starts, sudden braking, weaving in and out of traffic, and delay intervals between acceleration and braking are some examples of measurements that indicate driver performance. Calculations of environmental conditions such as weather, grade, altitude, and vehicle load are also made. By monitoring vehicle performance, driver performance, and environmental conditions allows for a full range of parameters be evaluated by which the efficiency of an individual operator can be determined. In response, appropriate positive, neutral, or negative feedback can be provided by the active seat.

Additional sensors may be utilized with respect to hybrid vehicles and electric vehicles. For hybrids, the charge status of the vehicle battery is an operating condition that influences the operation of the automotive engine within in a hybrid vehicle. For instance, in times of a low battery charge, the automotive engine would need to operate more frequently to charge the battery. Such fuel use falls within normal operating parameters of the vehicle and should not be interpreted as a negative event. The same sensors and processes with respect to all electric vehicles can also be utilized to determine how efficiently the electric vehicle has been operated. Aggressive driving techniques in either a hybrid or all electric vehicles will increase the "fuel" costs for operating the vehicle.

The use of sensing apparatuses as set forth in Tables 1 and 2 are well known and are currently used within the automotive industry, aerospace industry, and recreational environments such as amusement parks. Further, the use of some sensor technology with respect to haptic feedback is also known as seen in reference to U.S. Pat. No. 7,864,034 assigned to Nissan Motor Company entitled "Driver Assisting System for Vehicle and Vehicle Equipped with Driver Assisting System" which is incorporated herein by reference. The U.S. Pat. No. 7,864,034 reference is generally directed to warning drivers of dangerous conditions such as obstructions, slow moving vehicles, or vehicle drift to the left or right of the intended direction of travel.

U.S. Pat. No. 7,681,949 to Lear Corporation entitled "Haptic Vehicle Seat" which is incorporated herein by reference is directed to a seat and system for imparting sensations to alert the driver or passenger of various operating conditions.

U.S. Pat. No. 6,422,941 entitled "Universal Tactual Feedback System for Computer Video Games and Simulations" in which is incorporated herein by reference, discloses a seat feedback system in which various computer and video game simulations provide for tactual users sensations via the seat.

To date, no one has combined the tactual seat capabilities with enhanced vehicle data so as to provide more accurate calculations of fuel economy and then transmit such information to a driver or occupant of the vehicle.

FIG. 1 illustrates a haptic seating system 10 in accordance with one non-limiting aspect of the present invention. The system 10 may be used to provide passenger seating in vehicles and other environments where it is desirable to alert passengers of various operating conditions with some sort of tactile sensation, such as a vibration, pulse, shake, or other inducement that involves the occupant's sense of touch.

The system 10 generally includes a haptic seat 14 and controller 16, such as vehicle system controller. The controller 16 may be configured to monitor vehicle operating parameters related to fuel economy and to generate a feedback control signal as a function thereof. The signal may be used to control vibrations within the seat 14, and thereby, alerting of the driver. The controller 16 may vary the characteristics and/or instructions embedded within the signal in order to control the type, frequency, amplitude, position of the vibration on the seat, and other characteristics of the seat vibration.

The controller 16 may be configured to determine lane changes, acceleration, road grade timing intervals between accelerator use and engagement of a brake, coasting time/distance, and other parameters. The controller 16 may monitor and process any number of variables for use in controlling seat vibrations and the present invention is not intended to be limited to the listed parameters identified herein. In particular, the present invention fully contemplates the use of any number of parameters for determining fuel economy conditions under which it may be advantageous to alert the driver. Controller 16 is therefore in communication with various sensors as described in Tables 1 and 2. Moreover, the present invention fully contemplates varying or otherwise adjusting the vibrations as a function of the severity of the alert and any number of other parameters.

The seat 14 may include a bottom seat cushion 20 and back seat cushion 22 such that a bottom trim lining 24 and back trim lining 26 may be arranged over top of the seat cushions 20-22 to protect the seat cushions 20-22 and to provided variable surface amenities and textures. The seat cushions 20-22 and linings 24-26 may comprise any suitable material. For example, the seat cushions 20-22 may comprise a foam material and the seat linings 24-26 may comprise a cloth or leather material.

The seat 14 may include a connecting feature 30 for connecting to a seat track (not shown) of a vehicle floor (not shown). The connecting feature 30 may include any number of elements, devices, fasteners, actuators, and other members commonly employed with vehicle seating to facilitate attachment of the seat 14 to the seat track such that the position of the seat may be adjusted by adjusting its positioning with respect to the seat track, as one having ordinary skill in the art will appreciate.

The seat 14 may include one or more impulse distribution arms 34-36 and actuators 38-40 resting on top of the bottom seat cushion 20 and the back seat cushion 22. The actuators 38-40 are attached to the impulse distribution arms 34-36 and configured to vibrate the arms 34-36 such that at least a portion of a vibration induced in the arms 34-36 travels through the seat 14 to be felt by the occupant. This vibration may be used to provide the haptic alert function described above.

The impulse distribution arms 34-36 and actuators 38-40 shown in FIG. 1 rests on a top side of the seat cushions 20-22. The impulse distribution arms 34-36 may comprises any suitably rigid or semi-rigid material having characteristics conducive to transmitting the vibrations from the actuators 38-40 through the seat 14 so that the vibrations may be felt by the seat occupants. For example, the impulse distribution arms 34-36 may comprise any suitably rigid or semi-rigid material or wire that may be shaped and contoured according to the shape and contour of the seat cushions 20-22 and lining 24-26.

Seat 14 with actuators 38-40 and impulse distribution arms 34-36 can be used to transmit a variety of varying types of impulses and intensity of impulses to a driver based upon fuel economy feedback from the various sensors. Controller 30, which may be remote from the seat but otherwise in communication, can receive information from various sensors set forth in Tables 1 and 2 and compiled sensor information to indicate a continuous measurement of fuel economy. It is increasingly common on new automotive vehicles and commercial trucks to have a "black box" recorder system that will record a number of conditions relative to the operation of the vehicle. Such information can include acceleration, engagement of brakes, fuel consumption, steering information, acceleration and deceleration data and similar vehicle performance data that may be used and communicated to Controller 30. In addition, separate sensors such as those set in Table 1 and Table 2 so as to provide necessary information to Controller 30. Controller 30 can communicate with various actuators 38-40 so as to induce an appropriate vibration in an appropriate alert function.

Seat 14 as seen in FIG. 1 may have placement of actuators 38-40 in several different locations within the bottom seat cushion or along the seat back. Likewise, the impulse distribution arms 34-36 can be present anywhere within the seat cushion or seat back to bring about the desired placement and intensity of impulses. The various actuators and distribution arms can be used to provide a pulsing moving vibrations if desired. Further, vibrations can also be provided through the use of speakers located under or within the seat.

Figure 2:
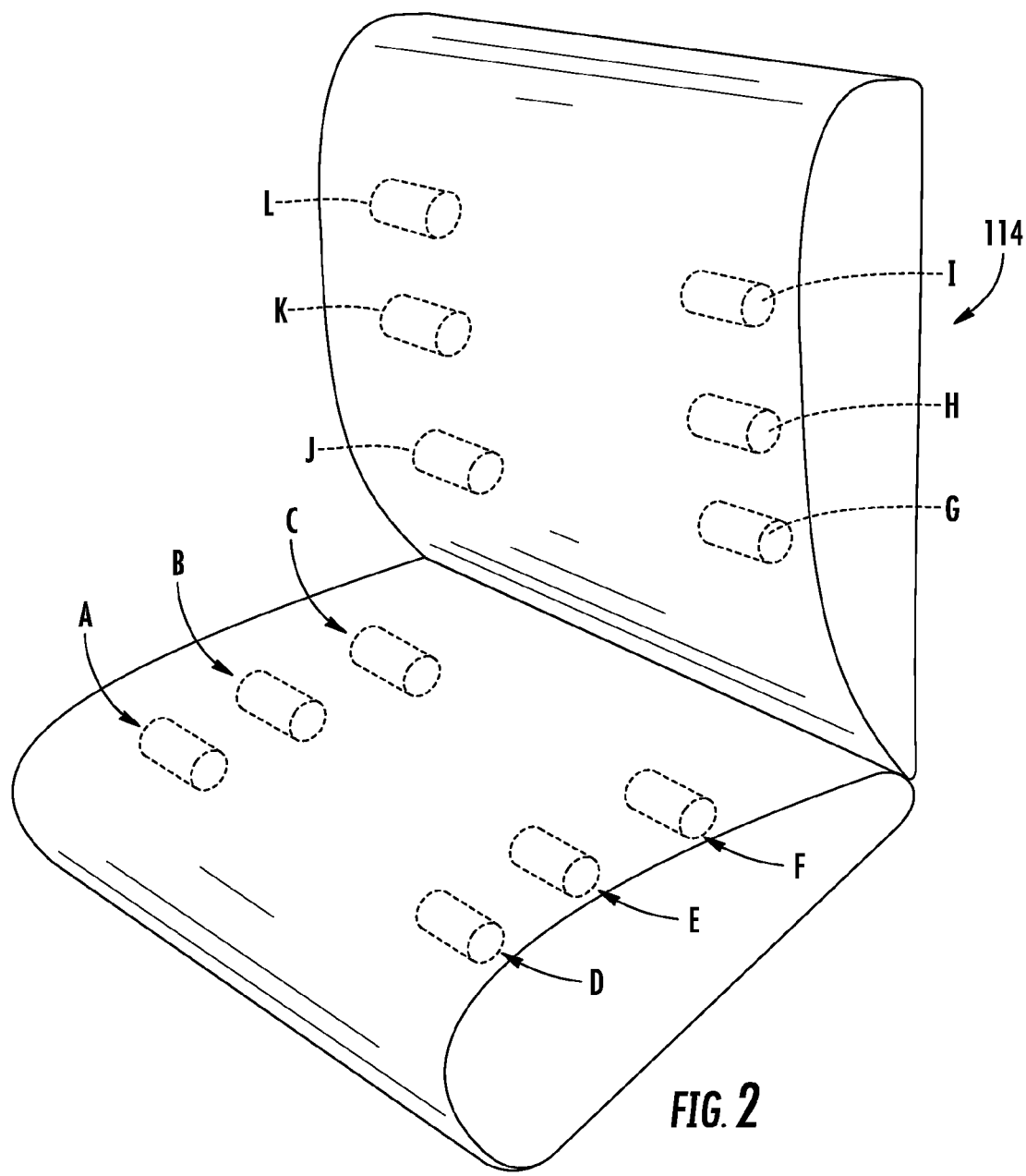
FIG. 2 illustrates an alternative seating system that may be utilized as either a seat or a removal seat cushion incorporating haptic alerting components.

As seen in reference to FIG. 2, an alternative seat embodiment 114 setting forth an alternative embodiment of the haptic seat construction. Seat 114 can be either in the form of a substantially permanent seat for a vehicle or be in a form of a removable seat cushion. In either form, various actuators as seen by actuators A-I may be positioned along a portion of the seat bottom as well as the seat back. Communication between the various actuators A-I can be similar to the communication described in reference to the embodiment of FIG. 1 and including necessary electrical control systems and communication wiring so as to communicate with the various sensors and control units as described in reference to FIG. 1 as further described in reference to various publications identified elsewhere in this application and incorporated herein by reference.

The various actuators A-I can be a similar construction or provided from different types of actuators. Suitable actuators could include speakers to provide both a vibration as well as an audio signal the use of unbalanced motors to generate vibration and noise and include the use of pneumatic cylinders or pressure responsive bladders which will exert pressure upon the individual using the seat or seat cushion. Any number of signaling devices of an auditory or tactile nature is suitable in accordance with the present invention.

As seen in reference to FIG. 2, the use of the plurality of actuators allows for a greater degree of information that can be provided to a driver. For instance, where multiple actuators are utilized as seen in FIG. 2, the order of cycling of the actuators can be indicative of the various conditions. For instance, the cycling of actuators of a then B then C can provide for a different need than a reverse order of actuation of C and B and then A. Likewise, the intensity of the vibration, sound or tactile response can also be varied to provide additional qualitative feedback to the user.

The various vibrations can be varied as to a location, intensity, or pattern to establish a positive feedback of efficient fuel economy through the seat. Similarly, a unique pattern of vibrations can be used as associated with negative or poor fuel economy. A separate unique pattern of vibrations can be used as associated with positive or good fuel economy. Both the positive and negative feedback could vary in intensity based on how well or poor the vehicle is being operated.

In this manner, a driver, or a passenger in a seat so equipped, can receiver real time information as to fuel economy without having to divert attention from traffic and road conditions. Similarly, the number and types of sensors may be aggregated so as to enable a highly sophisticated calculation of fuel economy that will adjust for actual driving conditions such as road grade or environmental conditions such as rain or temperature which may affect fuel efficiency. By taking such factors into account, the haptic seat in process avoids providing negative information regarding fuel economy for operating perimeters and conditions that are outside the control of the driver.

Another version of this system would compare instantaneous fuel economy with data stored either on board the car or at a central location. Based on the comparison of data, both positive and negative feedback could be presented to the driver. This adds haptic seat feedback to the system described in US Patent Application US2007/0027593 and which is incorporated herein by reference.

A further existence for the system may be transported between vehicles so as to enable driver training. The system, including a sensor array and haptic seating could be temporarily placed in a vehicle to help teach the driver more fuel-efficient ways of driving. In conjunction with the training, the controller could provide feedback to multiple seats, such as that occupied by an instructor. This enables the instructor to feel the feedback presented to the driver and then observe the response by the driver, enabling a more meaningful critique of the driver's response.

Finally the system could have a control for intensity of feedback, to enable the feedback to be adjusted to accommodate for a range of clothing weights between heavy weight winter clothing and light weight summer clothing as well as variations in sensitivity of the operator. The control could be a knob in the vehicle, for instance in an individually owned vehicle, or require programming to adjust, for instance in a fleet owned delivery truck.

It is further recognized that the system can be built into a seat that may be removed from one vehicle and installed into another. Additionally, the system can be designed as a type of seat cover that could be easily moved from one vehicle to another. Appropriate interface between the various sensors and the seat could be accomplished through appropriate plug in type connectors which would provide electrical power as well as sensor communication with the transportable seat cover.

The controller can also be provided with several program options including a base generic program as well as selectable programs designed for various types of cars or vehicles. Such program can be updated with additional data and programming if desired. It is further envisioned that the controller may further include a data recorder that could store and evaluate driving patterns that is further selectable so as to segregate the data based upon individual drivers.

The haptic seat can also work with current data generated by many cars which provide for an instantaneous readout of mpg. Through sensory feedback, the indication of poor, average, or high mile per gallon feedback can be directed to the driver. The process is an improvement over visual displays that an operator may not pay attention to or requires an operator to intentionally access a data panel in order to obtain the data.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the claims of the present invention. In addition, it should be understood that aspects of the various embodiments may be interchanged, both in whole, or in part. Therefore, the spirit and scope of the invention should not be limited to the description of the preferred versions contained therein.

That which is claimed:

1. A process of monitoring fuel economy comprising:
providing a vehicle having a plurality of environmental sensors including a temperature sensor, a pitch sensor, a roll angle sensor, a grade sensor, an altitude sensor and a payload sensor;
providing information from the plurality of environmental sensors to a controller including an environmental temperature in which the vehicle is operating, a vehicle angle of incline, a payload, and an altitude in which the vehicle is operating;
providing additional vehicle operation data to the controller;
determining theoretical maximum fuel efficiency under the conditions that the vehicle is experiencing based upon the information from the environmental sensors including the environmental temperature in which the vehicle is operating, the vehicle angle of incline, the payload, and the altitude in which an automotive vehicle is operating and the information of vehicle operation data;
following said step of determining the theoretical maximum fuel efficiency, providing sensory feedback in real time via the controller to a seat of the operator to inform the operator of behavior which has an adverse impact on the fuel economy of the vehicle based on a comparison of the maximum theoretical fuel efficiency to an actual fuel efficiency of the vehicle.

2. The process according to claim 1 wherein additional environmental sensors are selected from a group of environmental sensors selected from the group consisting vehicle height sensors, and GPS sensors.

3. The process according to claim 1 wherein the vehicle operation data includes data selected from the group consisting of throttle position sensors, pitch angle sensors, fuel flow sensors, braking sensors, speed sensors, longitudinal G's sensor, lateral G's sensor and combinations thereof.

4. The process of claim 1, wherein the seat of the operator comprises a plurality of actuators in communication with the controller and wherein the providing sensory feedback via the controller to a seat comprises, actuating two or more actuators of the plurality of actuators via the controller to inform the operator of behavior which has an adverse impact on the fuel economy of the vehicle.

5. The process of claim 4, wherein the providing sensory feedback via the controller to a seat further comprises cycling two or more actuators of the plurality of actuators via the controller in different orders to be indicative of various conditions of which the operator is to be made aware.

6. The process of claim 1, wherein the providing sensory feedback via the controller to a seat further comprises varying an intensity of the sensory feedback to provide additional qualitative feedback to the operator.

7. The process of claim 1, wherein the additional information of vehicle operation data comprises acceleration rates and deceleration data from accelerometer sensors.

8. A process of monitoring fuel economy comprising:
determining via sensors an environmental temperature in which an automotive vehicle is operating, a vehicle angle of incline, a payload, and an altitude in which the automotive vehicle is operating;
calculating a maximum theoretical fuel efficiency for the automotive vehicle based on the determined temperature, vehicle angle of incline, payload and altitude;
evaluating using a controller an actual fuel efficiency of the automotive vehicle compared to the maximum theoretical fuel efficiency;
relaying information in real time from the controller to a haptic seat engaged by an operator, the information being relayed only when actions controlled by the operator can improve a fuel efficiency of the automotive vehicle based on the evaluation of the actual fuel efficiency of the automotive vehicle compared to the maximum theoretical fuel efficiency.

9. A process of monitoring fuel economy of an automotive vehicle comprising:
determining vehicle operating conditions of the automotive vehicle via sensors including an environmental temperature in which the vehicle is operating, a vehicle angle of incline, a vehicle payload, and an altitude of the vehicle;
determining operator controlled parameters relative to a fuel efficiency of the vehicle;
calculating maximum theoretical fuel efficiency for the operating conditions of the vehicle including the operating temperature, the vehicle angle of incline, the vehicle payload, and the altitude of the vehicle;
comparing the maximum theoretical fuel efficiency to an actual fuel efficiency of the vehicle;
relaying information in real time from a controller on a qualitative evaluation of fuel efficiency to an operator using a sensory information haptic seat delivery system and delivering information from the controller only when changes to operator behavior can improve actual fuel efficiency based on the comparison of the maximum theoretical fuel efficiency to the actual fuel efficiency of the vehicle.

* * * * *